US009405034B2

(12) United States Patent
Mogilatov (10) Patent No.: US 9,405,034 B2
(45) Date of Patent: Aug. 2, 2016

(54) ELECTROMAGNETIC LOGGING IN TIME DOMAIN WITH USE OF SPECIFIC CURRENT PULSES

(75) Inventor: Vladimir S. Mogilatov, Novosibirsk (RU)

(73) Assignee: BAKER HUGHES INCORPORATED, Houston, TX (US)

( * ) Notice: Subject to any disclaimer, the term of this patent is extended or adjusted under 35 U.S.C. 154(b) by 1264 days.

(21) Appl. No.: 12/577,424

(22) Filed: Oct. 12, 2009

(65) Prior Publication Data

US 2010/0191469 A1 Jul. 29, 2010

Related U.S. Application Data

(63) Continuation of application No. PCT/RU2009/000023, filed on Jan. 27, 2009.

(51) Int. Cl.
*G01V 3/18* (2006.01)
*G01V 3/26* (2006.01)

(52) U.S. Cl.
CPC .................................. *G01V 3/26* (2013.01)

(58) Field of Classification Search
CPC ............................................. G01V 3/26
USPC ................................................ 702/7
See application file for complete search history.

(56) References Cited

U.S. PATENT DOCUMENTS

| 4,417,210 | A | * | 11/1983 | Rocroi | ................ | G01V 3/38 |
| | | | | | | 324/336 |
| 4,730,162 | A | | 3/1988 | Vinegar et al. | | |
| 5,675,147 | A | * | 10/1997 | Ekstrom | ................ | G01V 11/00 |
| | | | | | | 250/256 |
| 5,955,884 | A | * | 9/1999 | Payton | .................... | G01V 3/26 |
| | | | | | | 324/339 |
| 2005/0083061 | A1 | * | 4/2005 | Tabanou | ................. | G01V 3/28 |
| | | | | | | 324/334 |
| 2005/0189945 | A1 | | 9/2005 | Reiderman | | |
| 2006/0038571 | A1 | | 2/2006 | Ostermeier et al. | | |

OTHER PUBLICATIONS

Cherkaeva, et al. "On optimal design of transient electromagnetic waveforms" Electromagnetics 4: New Frontiers in EM. XP-002557508. Nov. 25, 2009. pp. 438-441.
International Search Report and Written Opinion, Mailed Sep. 12, 2009, International Appln. No. PCT/RU2009/000023, Written Opinion 7 Pages, International Search Report 8 Pages.
Wait, J.R. (1987). Geoelectromagnetism. Transl. from Eng. Moscow, USSR: Nedra, p. 235.

(Continued)

*Primary Examiner* — Hyun Park
(74) *Attorney, Agent, or Firm* — Cantor Colburn LLP (57) ABSTRACT

A method for estimating a property of an earth formation in a zone of investigation, the earth formation having the zone of investigation and another zone, the method including: applying a compound pulse of electromagnetic energy to the earth formation, the compound pulse having a shape to induce a predominately greater amount of current in the zone of investigation than in the another zone, wherein the compound pulse includes a first pulse and a second pulse, the first pulse having an amplitude different from the amplitude of the second pulse; receiving a response of electromagnetic energy from the current induced by the compound pulse; and estimating the property from the response of electromagnetic energy.

17 Claims, 8 Drawing Sheets

(56) References Cited

OTHER PUBLICATIONS

Kaufman, A.A. (1994). Geophysical Field Theory and Method, Part C. Academic Press, p. 335.

Mogilatov, V.S. (2002). Pulse Electrical Survey. Novosibirsk, Russia: Novosibirsk State University Press, p. 208.

Tabarovsky, L.A. (1975). Using Methods of Integral Equations for Geoelectrical Problems. Novosibirsk, USSR: Nauka. With English translation attached.

Cherkaeva et al. "On optimal design of transient electromagnetic waveforms" Electromagnetics 4: New Frontiers in EM. XP-002557508. Nov. 6, 1997. pp. 438-441.

* cited by examiner

| APPLYING A COMPOUND PULSE OF ELECTROMAGNETIC ENERGY TO AN EARTH FORMATION, THE COMPOUND PULSE HAVING A SHAPE TO INDUCE A PREDOMINATELY GREATER AMOUNT OF CURRENT IN A ZONE OF INVESTIGATION THAN IN ANOTHER ZONE, WHEREIN THE COMPOUND PULSE INCLUDES A FIRST PULSE AND A SECOND PULSE, THE FIRST PULSE HAVING AN AMPLITUDE DIFFERENT FROM THE AMPLITUDE OF THE SECOND PULSE | — 101 |

↓

| RECEIVING A RESPONSE OF ELECTROMAGNETIC ENERGY FROM THE CURRENT INDUCED IN THE EARTH FORMATION BY THE COMPOUND PULSE | — 102 |

↓

| ESTIMATING A PROPERTY OF THE EARTH FORMATION IN THE ZONE OF INVESTIGATION FROM THE RESPONSE OF ELECTROMAGNETIC ENERGY | — 103 |

*Fig. 10*

ELECTROMAGNETIC LOGGING IN TIME DOMAIN WITH USE OF SPECIFIC CURRENT PULSES

BACKGROUND OF THE INVENTION

1. Field of the Invention

The present invention relates to estimating a property of an earth formation. More specifically, the invention relates to apparatus and methods for performing transient electromagnetic sounding in a borehole to determine the property.

2. Description of the Related Art

Exploration and production of hydrocarbons requires knowledge of a subsurface earth formation that may contain reservoirs of the hydrocarbons. Transient electromagnetic (TEM) sounding at the surface of the earth is one way of gathering this knowledge.

Traditional TEM sounding is based on applying a series of electromagnetic energy pulses to the earth formation using a switch-off current mode. The series of pulses requires identical sharp pulses of source current applied to a transmitter coil. The pulses induce circulations of current in the earth formation. The circulations of current in turn induce electromagnetic signals in a receiver. A characteristic of the electromagnetic signals can be related to a property of the formation such as conductivity.

Traditional TEM sounding at the surface of the earth can have some drawbacks. One drawback is that earth formations containing reservoirs of hydrocarbons may be located deep inside the earth. The reservoirs may be beyond the reach of the electromagnetic energy pulses. Another drawback is that traditional TEM sounding may not be able to discriminate between different distances into the formation.

Therefore, what are needed are techniques to measure a property of an earth formation deep inside the earth using TEM sounding. Preferably, the techniques can discriminate between different distances into the earth formation.

BRIEF SUMMARY OF THE INVENTION

Disclosed is a method for estimating a property of an earth formation in a zone of investigation, the earth formation having the zone of investigation and another zone, the method including: applying a compound pulse of electromagnetic energy to the earth formation, the compound pulse having a shape to induce a predominately greater amount of current in the zone of investigation than in the another zone, wherein the compound pulse includes a first pulse and a second pulse, the first pulse having an amplitude different from the amplitude of the second pulse; receiving a response of electromagnetic energy from the current induced by the compound pulse; and estimating the property from the response of electromagnetic energy.

Also disclosed is an apparatus for estimating a property of an earth formation in a zone of investigation, the earth formation having the zone of investigation and another zone, the apparatus including: a logging instrument; a transmitter; a receiver; and a processing system configured to implement the following instructions: applying a compound pulse of electromagnetic energy to the earth formation, the compound pulse having a shape to induce a predominately greater amount of current in the zone of investigation than in the another zone, wherein the compound pulse includes a first pulse and a second pulse, the first pulse having an amplitude different from the amplitude of the second pulse; receiving a response of electromagnetic energy from the current induced by the compound pulse; and estimating the property from the response of electromagnetic energy.

Further disclosed is a computer program product stored on machine-readable media having machine-executable instructions for estimating a property of an earth formation in a zone of investigation, the earth formation including the zone of investigation and another zone, by implementing a method including: applying a compound pulse of electromagnetic energy to the earth formation, the compound pulse having a shape to induce a predominately greater amount of current in the zone of investigation than in the another zone, wherein the compound pulse includes a first pulse and a second pulse, the first pulse having an amplitude different from the amplitude of the second pulse; receiving a response of electromagnetic energy from the current induced by the compound pulse; and estimating the property from the response of electromagnetic energy.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

Disclosed are embodiments of techniques for performing transient electromagnetic (TEM) sounding from within a borehole penetrating an earth formation. The techniques, which include apparatus and method, call for emitting an electromagnetic energy pulse with a certain shape. The shape is optimized to induce circulating currents in a zone of investigation in the formation that is a specific distance from the borehole. In addition, the shape is optimized to minimize induced circulating currents in other zones of the formation. Thus, electromagnetic energy induced in a receiver in the borehole will result mainly from the circulating currents in the target zone. The electromagnetic energy is related a property of the formation, and, therefore, the property can be estimated by measuring the induced electromagnetic energy.

Certain definitions are presented here for convenience. The terms "pulse" and "impulse" relate to electromagnetic energy of a certain shape and finite duration transmitted into the earth formation. The terms pulse and impulse may be used interchangeably herein. The terms "compound" or "complex" relate to a pulse of electromagnetic energy that has two or more components. Each of the components has a distinguishing feature. Non-limiting examples of the distinguishing feature include amplitude, duration, shape, and polarity. In one embodiment, a compound pulse may include two components also referred to as pulses such that the compound pulse is made up of the two pulses. The terms compound and complex may be used interchangeably herein. The term "predominately" relates to an amount of current induced in a zone of investigation in the earth formation relative to an amount of current induced in another zone in the earth formation. A predominately greater amount of current induced in the zone of interest will provide a response of electromagnetic energy that can be related to a property of the earth formation in the zone of investigation. As used herein, the term predominately relates at least to a minimum amount of increase in currents induced in the zone of investigation with respect to other zones, the minimum amount being necessary to be able to estimate a property of the earth formation in the zone of investigation from the response. The term "q" relates to an effective cross-section of a receiver coil. In one embodiment, the effective cross-section is determined by multiplying the cross-sectional area of one turn in the coil by the number of turns in the coil.

Figure 1:
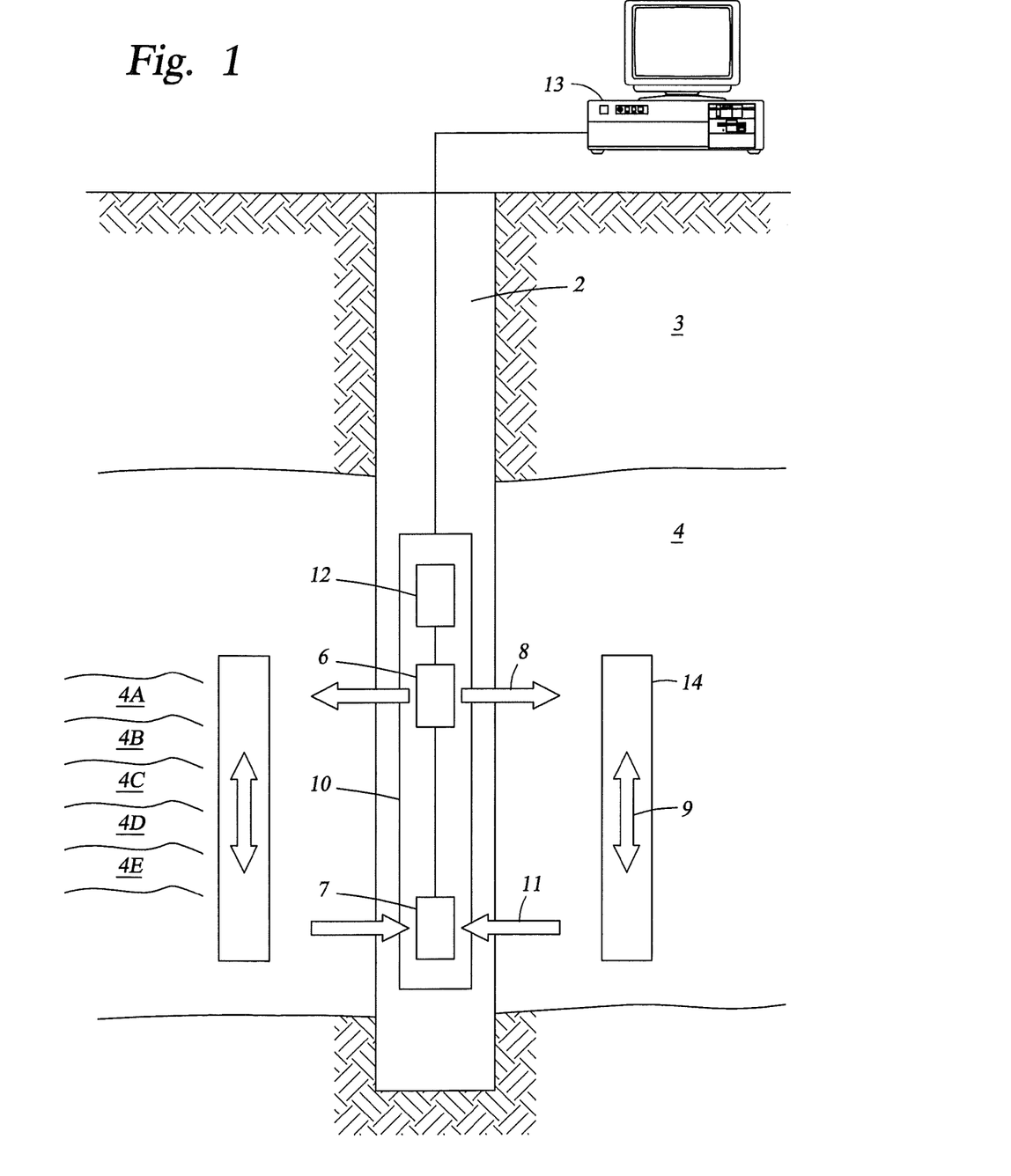
FIG. 1 illustrates an exemplary embodiment of a logging instrument disposed in a borehole penetrating the earth.

Referring to FIG. 1, an exemplary embodiment of a well logging instrument 10 is shown disposed in a borehole 2. The borehole 2 is drilled through earth 3 and penetrates a formation 4, which include various formation layers 4A-4E. In the embodiment of FIG. 1, the logging instrument 10 is lowered into and withdrawn from the borehole 2 by use of an armored electrical cable 5 or similar conveyance as is known in the art. In other embodiments, the logging instrument 10 may perform measurements, referred to as logging-while-drilling (LWD), during drilling operations or during a temporary halt.

The logging instrument 10 as shown in FIG. 1 is configured to estimate a property of the formation 4 using TEM sounding. Referring to FIG. 1, the logging instrument 10 includes a transmitter 6 and a receiver 7. The transmitter 6 transmits an electromagnetic energy pulse 8 into the borehole 2 and the formation 4. The electromagnetic energy pulse 8 induces currents 9 in the formation 4 mainly at a zone of investigation 14 related to the shape of the pulse 8. The currents 9 in turn induce electromagnetic energy 11 in the receiver 7. In the embodiment of FIG. 1, the logging instrument 10 includes an electronic unit 12. The electronic unit 12 can be configured to operate the logging instrument 10. Examples of operations performed by the electronic unit 12 include transmitting the electromagnetic energy pulse 8 with a specific shape and receiving data related to the electromagnetic energy 11 induced in the receiver 7. In addition, the electronic unit 12 can be configured to transmit the data to a processing system 13 at the surface of the earth 3 using the electrical cable 5 or a telemetry system for LWD applications. In addition, for LWD applications, the data can be stored in the electronic unit 12 for later retrieval when the logging instrument 10 is removed from the borehole 2.

In the embodiment of FIG. 1, the processing system 13 is configured to determine the specific shape needed to induce the circulating currents 9 at the distance D from the borehole 2. In addition, the processing system 13 is configured to estimate a property of the formation 4 at distance D using the data received from the logging instrument 10.

Examples of the techniques disclosed herein are presented next. We perform resolving five radial zones within 2 feet of the borehole 2 using time domain electromagnetic fields. One of the basic ideas behind the disclosed approach is to evaluate certain sequences of specific current pulses (to the transmitter 6) that may be very sensitive to specific areas of the formation 4 (up to five zones within two feet). As tools for investigation, we use a representation of the response as a sum of the input from isolated zones and we use the results of inversion for the estimate. Studying this option, we developed mathematical modeling, initial guess, and software tools for solving forward and inverse problems. Details of the mathematical analysis and calculations are disclosed later on in this document.

Figure 2:
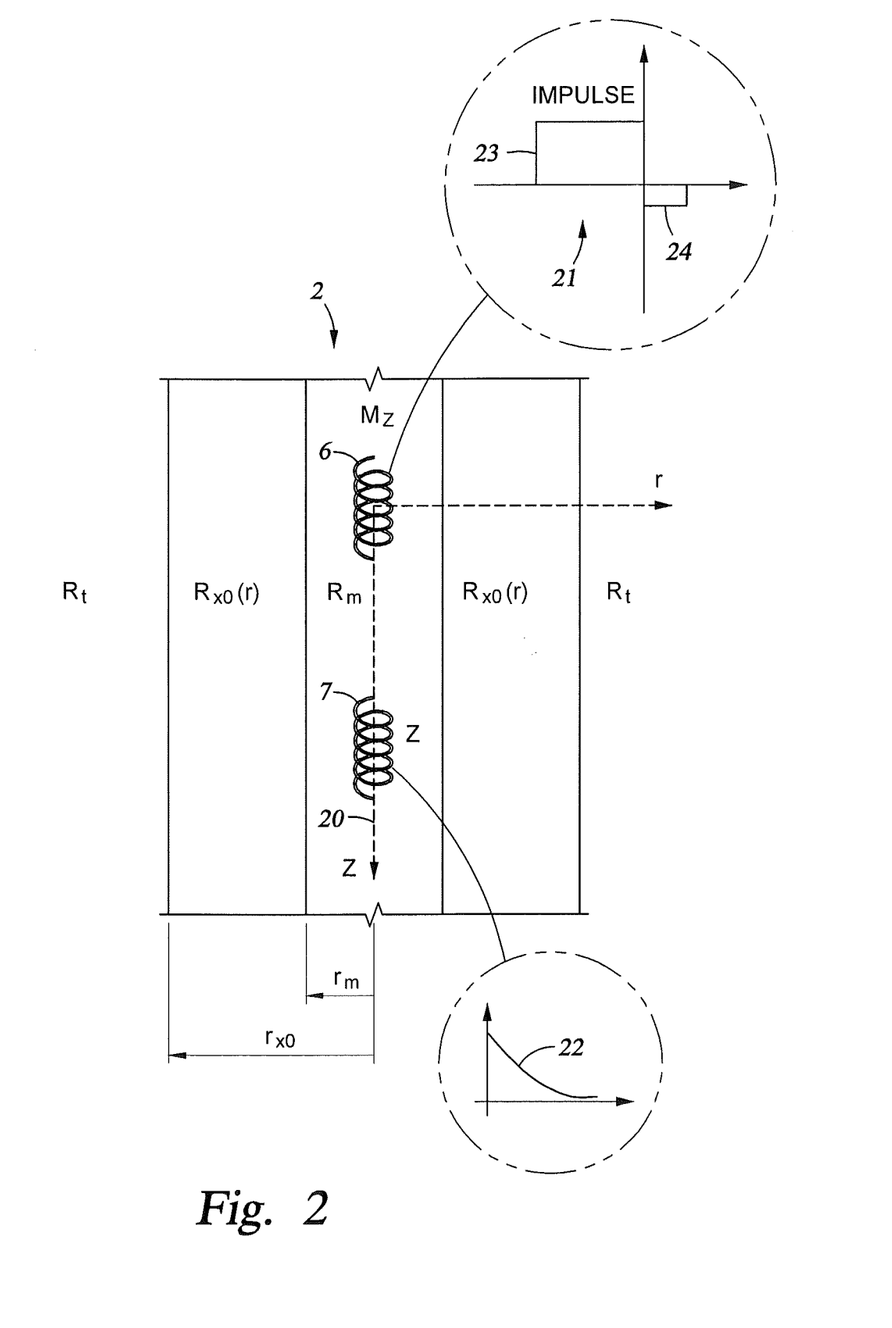
FIG. 2 depicts aspects of the logging instrument configured for transient electromagnetic logging in one dimensional cylindrical geometry.

Referring to FIG. 2, the logging instrument 10 with two coils configured for TEM logging is considered. The logging instrument 10 includes the following parameters: the instrument 10 includes the transmitter 6 of moment $M_z(t)$ and the receiver coil 7. Different current shapes are considered. The configuration is positioned on longitudinal axis 20 of the borehole 2 with resistivity $R_m$ and radius $r_m$. The resistivity of the formation is $R_t$. The radial resistivity profile in the invasion zone of radius $r_{xo}$ is described by a stepwise function $R_{xo}(r)$. This profile was represented by five subzones.

Next, a compound impulse 21 (referring to FIG. 2) is used to create the induced current 9 with a specific spatial distribution. An arbitrary pulse $P(\tau)$ can be presented as a sum of short rectangular pulses. If N rectangular pulses of durations $\Delta\tau$ are used, a total response 22 (referring to FIG. 2) can be presented as follows:

$$E(t) = \sum_{i=1}^{N} P(\tau_i) \cdot \left[ e\left(t - \tau_i - \frac{\Delta\tau}{2}\right) - e\left(t - \tau_i + \frac{\Delta\tau}{2}\right) \right] \quad (1)$$

The compound pulse 21 shown in FIG. 2 is made up of two components, a first pulse 23 and a second pulse 24. Other embodiments of the compound pulse 21 can include more.

The contribution to the measured signal from cylindrical area D ($r_1 \leq r \leq r_2$; $\bar{z}_1 \leq \bar{z} \leq \bar{z}_2$) can be expressed (for a rectangular pulse) as the following integral:

$$Emf_D = \frac{M_z q \mu}{32\pi\sqrt{\pi}} \cdot \frac{\partial}{\partial t} \left\{ \left(\frac{\mu\sigma}{t}\right)^{5/2} \cdot \int_{r_1}^{r_2} \int_{\bar{z}_1}^{\bar{z}_2} \frac{r^3 e^{-\frac{\mu\sigma}{4t}(r^2+z^2)} \, dr \, d\bar{z}}{[r^2 + (z-\bar{z})^2]^{3/2}} \right\} \quad (2)$$

We use a uniformly conductive medium of conductivity $\sigma$ or resistivity $\rho = 1/\sigma$. The source of the field is a vertical magnetic dipole of a moment $M_z$ (see FIG. 2).

Figure 3:
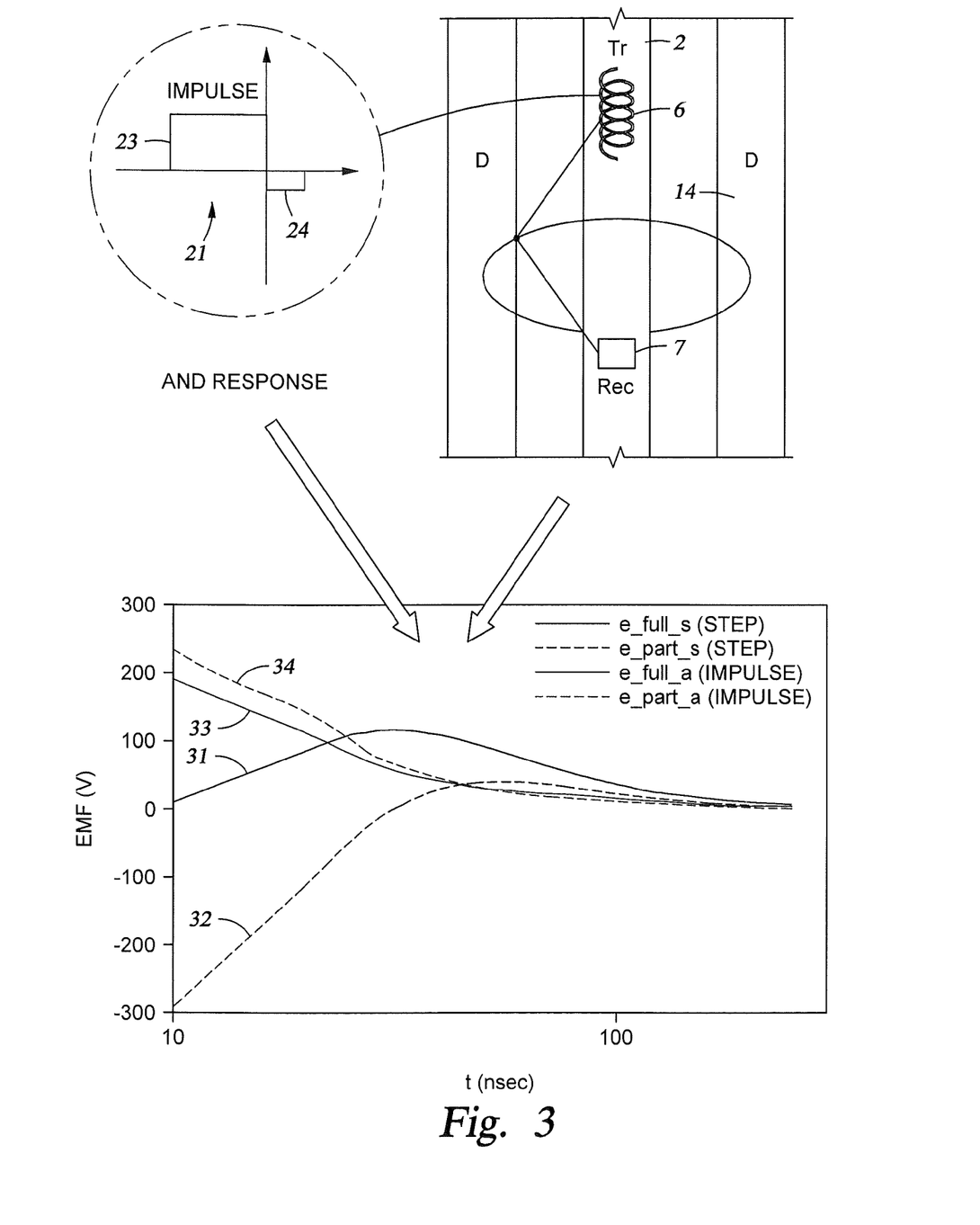
FIG. 3 depicts aspects of responses to different types of impulses.

In FIG. 3, the results of calculations based on equation (1) and equation (2) are given. Our goal is to create the induced current 9 with a specific spatial distribution, most of which is located in a region of interest (i.e., the zone of investigation 14) during the entire transient process. The parameters used in the creation of FIG. 3 are as follows: the D area has the following boundaries: $r_1 = 0.3$ m, $r_2$ 0.7 m, , $\bar{z}_1$ 0.5 m, $\bar{z}_2 = 1$ m; the moment of transmitter coil 6 is $M_z = 1$ A*m*m; for receiver coil 7 q=1 m*m; amplitude of the basic pulse $A_1 = 1$ and duration is 1000 nsec.; amplitude of the additional (negative) pulse, $A_2 = 0.7$ and duration is 25 nsec.; the resistivity $\rho = 1$ Ohm-m; length of tool (from transmitter 6 to receiver 7) is 0.5 m.

First, let us consider the case of step function excitation. The response is shown in FIG. 3 by the curves marked "step".

The total response (curve 31) differs greatly from the contribution from the D area (curve 32). This is an indication that a significant part of the current flows outside the D area.

Therefore, to increase the amount of current flowing inside the D area we propose to use a compound impulse 21 shown in FIG. 2. The impulse consists of a basic rectangular pulse followed by an additional shorter pulse with negative amplitude. The physics behind the idea is that the small negative pulse will eliminate the currents from a near-borehole zone, which is not part of the D area.

The curves marked "impulse" show the total response (curve 33) and the response from the D area (curve 34). They are very close to each other indicating that we succeeded in creating an electric field with the prescribed spatial distribution. Using the compound impulse, we kept a significant part of the current in the D area during the total transient process.

Figure 4:
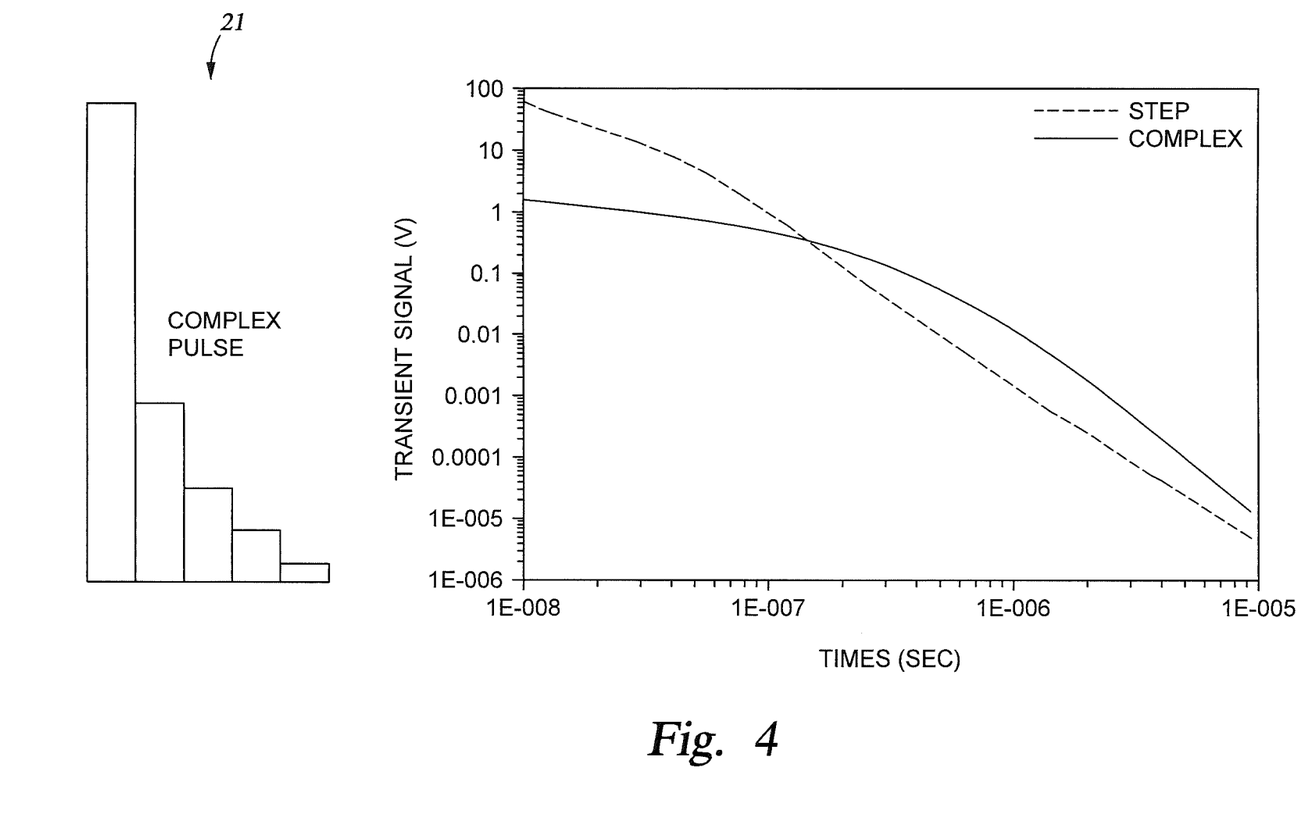
FIG. 4 depicts aspects of responses to different types of impulses in a multilayer cylindrical medium.

A complex impulse is used to create a transient electromagnetic field in a multilayer cylindrical environment. An algorithm named CYLTEM was created using equation (1) to compute the electric fields in the time domain caused by the compound pulse 21 in a cylindrically-layered environment. In FIG. 4, an example of such a computation is given. The environment described in Table 1 is the near-borehole zone (at distances of up to 0.6 m from the borehole axis), subdivided into five subzones based on their resistivities.

TABLE 1

Near Borehole Zone

| N | $\rho$ (Ohm-m) | $r_{bound}$ (m) |
|---|---|---|
| 1 | 10 | 0.1 |
| 2 | 10 | 0.2 |
| 3 | 30 | 0.3 |
| 4 | 10 | 0.4 |
| 5 | 5 | 0.5 |
| 6 | 2 | 0.6 |
| 7 | 10 | ∞ |

The parameters used in the creation of FIG. 4 are as follows: transient signal from 2-coil logging instrument 10 in a multilayer cylindrical medium; the moment of the transmitter coil 6 is $M_z=1$ A*m*m; for receiver coil 7 q=1 m*m; the amplitudes (relative) of the complex impulse 20 are: 100, 10, 1, 0.1, 0.01; duration is 5×100 nsec.; tool 10 length is 0.3 m (from transmitter 6 to receiver 7).

Figure 5:
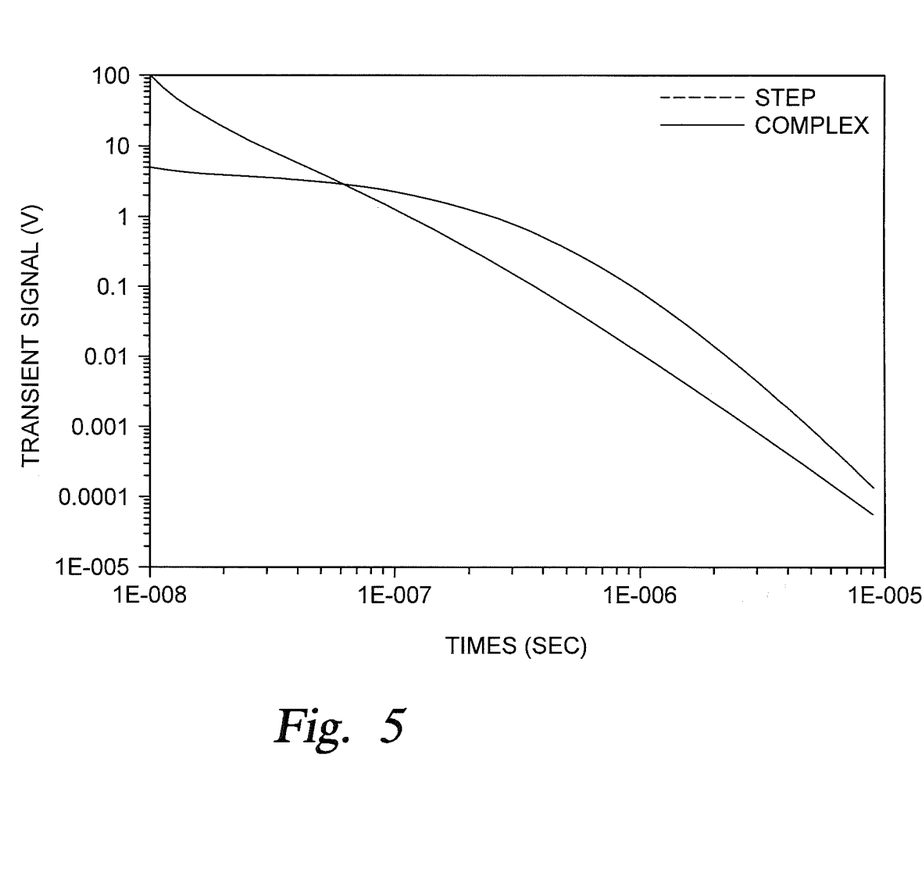
FIG. 5 depicts aspects of responses to different types of impulses with water-based mud in the borehole and a water-bearing formation.

In FIG. 5, results of computing electrical fields in another example are given. The environment is again the near-borehole zone (at distances of up to 0.6 m from the borehole axis). However, water-based mud is used and the formation 4 is water-bearing ($R_m=2$ Ohm-m; $R_t=2$ Ohm-m). The invasion zone is represented by five radial zones (referred to as "model 3b"). The parameters used in the creation of FIG. 5 are as follows: transient signal from 2-coil logging instrument 10 in a multilayer cylindrical medium (model 3b); the moment of transmitter coil 6 is $M_z=1$ A*m*m; for receiver coil 7 q=1 m*m; the amplitudes of the complex impulse 21 are: 100, 10, 1, 0.1, 0.01; duration is 5×100 nsec.; tool 10 length is 0.3 m (from transmitter 6 to receiver 7).

In FIG. 4 and FIG. 5, curves of the transient signal are given for the turn-off mode (i.e., step) and for excitation using the complex pulse 21. Applying the complex pulse 21 enables us to greatly decrease the dynamic range of the response.

Figure 6:
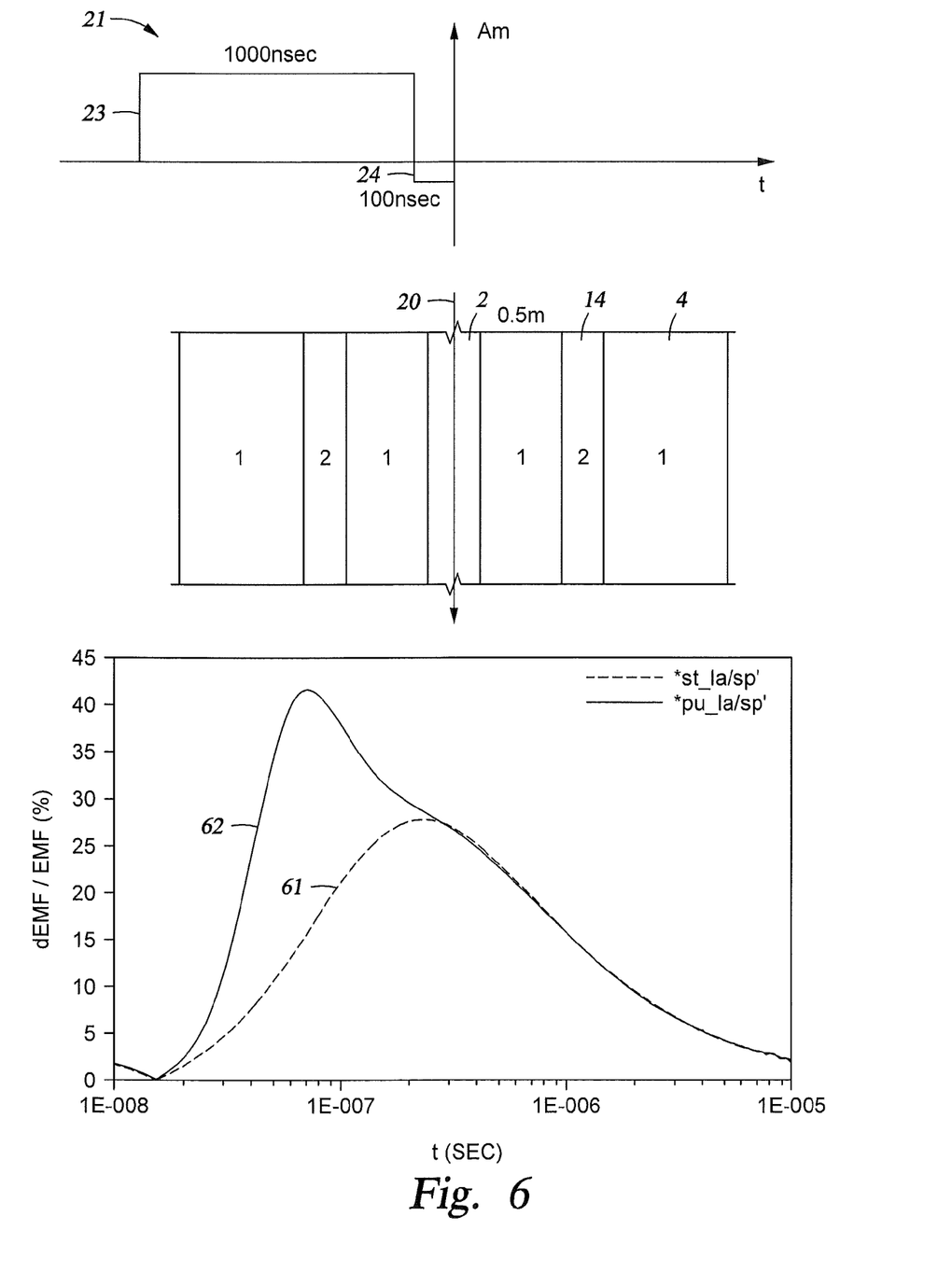
FIG. 6 depicts aspects of responses to different types of impulses for a three-layer environment.

In FIG. 6, results are shown for a three-layer environment created by placing the cylindrical layer into a homogeneous environment. The curves represent a relatively anomalous signal for a step-like turn-off of the current at the source (curve 61) and for the complex pulse 21 (curve 62). As shown in FIG. 6, using the outbalancing negative rectangular pulse lets us increase the input from 27% to 43%. The parameters used in the creation of FIG. 6 are as follows: model is cylindrical layer (Resistance=2 Ohm-m) into homogeneous (Resistance=2 Ohm-m) environment; the amplitude of the basic pulse $A_1=1$ and duration is 1000 nsec.; the amplitude of the additional (negative) pulse, $A_2=0.7$, duration is 100 nsec.; length of tool is 0.5 m. (from the transmitter 6 to the receiver 7).

Next, the transient mode is estimated using inversion. To investigate the possibility of using transient fields to study the near-borehole zone, we constructed an inversion algorithm based on the Born Approximation of the forward problem. The main advantage of this approach is that it establishes the linear dependence of a signal on disturbances in the conductivity.

Thus, the complete field created from N circular disturbances in a linear (Born) approximation may be expressed as follows:

$$Emf(t) = Emf_0(t) + \sum_{i=1}^{N} G_i(t) \cdot \Delta \sigma_i \qquad (3)$$

where $Emf_0(t)$ is the normal signal from a homogeneous environment and $G_i$ are some geometrical factors.

Equation (4) yields a linear set for defining disturbances if we substitute the measured full signal into the left part and consider the known conductivity of the reference homogeneous environment. However, we may also use the values of the apparent resistivity.

Figure 7:
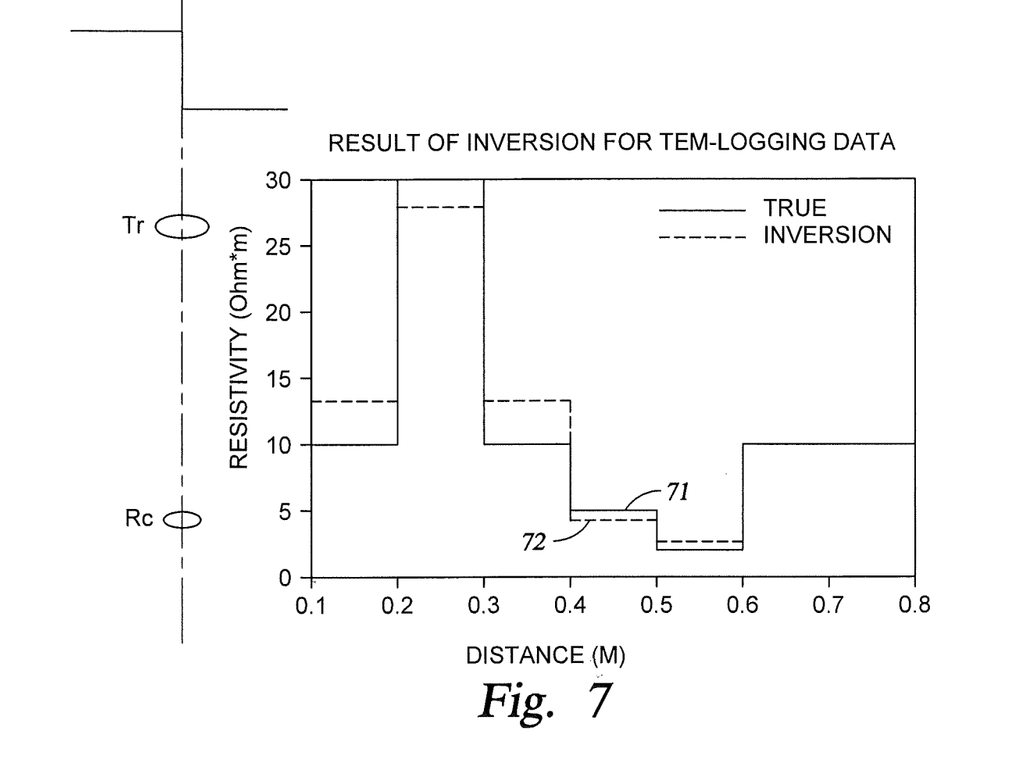
FIG. 7 illustrates a graph showing a relationship between resistivity and radius.

Some examples of inversion using equation (3) are presented. We will compute synthetic data using CYLTEM and the response at the axis for the model presented in Table 1, for the step-like pulse. This model is also presented in FIG. 7 as a graph showing the relationship between resistivity and radius (see curve 71). We use a simplified model because we are using a linear approximation based on a homogeneous reference model. The length of the instrument 10 used to create FIG. 7 is 0.5 meter from the transmitter 6 to the receiver 7. Inversion results are indicated by curve 72, and show that logging using Transient Electromagnetic Sounding lets us recover resistivities for five subzones. Values closest to true values were received after the first inversion step using the simplest reference environment. Further corrections are possible through iterations based on a more complex referent model.

It has been shown that using the proper pulse shape may control creation of measurement anomalies in the zone of interest. Inversion examples have shown that, within the zone from the borehole to the distance of 0.6 m away from the borehole axis, five subzones could be identified based on their resistivities, even when logging with a regular rectangular pulse. In addition, it has been shown that complex pulse usage can be used for blocking the impact from a conductive borehole.

A mathematical description of transient electromagnetic measurements using the compound current impulse 21 is presented next. First, a transient electromagnetic field in a homogenous environment is considered. Let us consider the behavior of a transient electromagnetic field in a uniformly conductive medium of a conductivity $\sigma$ or resistivity $\rho=1/\sigma$. We choose the cylindrical system of coordinates (r, $\phi$, z). The source of the field is a vertical magnetic dipole of moment $M_z(t)$ placed at the origin of this system FIG. 8.

Figure 8:
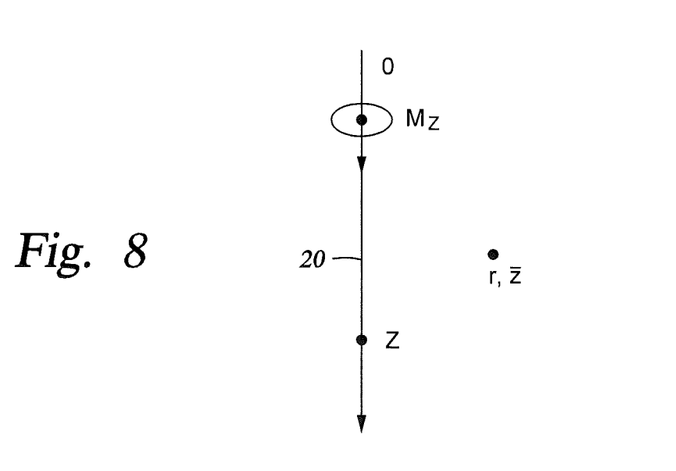
FIG. 8 illustrates a magnetic dipole in a homogeneous environment.

Suppose that a moment $M_z$ is switched off instantaneously so it can be described as a step function of time:

$$M_z(t) = \begin{cases} M_z & t < 0 \\ 0 & t > 0 \end{cases}. \tag{4}$$

The expression for the electric field in a frequency domain can be written as:

$$E\varphi(r, \bar{z}, \omega) = -i\omega\mu \cdot \frac{M_z}{4\pi} \cdot \frac{\partial}{\partial r}\left(\frac{e^{-kR}}{R}\right). \tag{5}$$

Applying the Fourier transform for the frequency domain, we can also obtain an expression for $E_\varphi$ in the time domain for step-function excitation:

$$E_\varphi(r, \bar{z}, t) = \frac{\mu M_z}{4\mu} \cdot \frac{\partial}{\partial r} \int_{-\infty}^{\infty} \frac{e^{-kR}}{R} e^{-i\omega t} \tag{6}$$

where $k^2 = -i\omega\mu\sigma$ and $R = \sqrt{r^2 + \bar{z}^2}$ (quasi-stationary approximation).

Let us substitute $s = -i\omega$ and represent Equation (8) as an inverse Laplace transform:

$$E_\varphi(r, \bar{z}, t) = \frac{\mu M_z}{4\mu} \cdot \frac{\partial}{\partial r} \left\{ \frac{1}{R} \frac{1}{2\pi i} \cdot \int_{\gamma-i\infty}^{\gamma+i\infty} e^{-\alpha\sqrt{s}} e^{st} ds \right\} \tag{7}$$

where $\alpha = R\sqrt{\mu\sigma}$, and $\gamma$ is a constant. This is a reference integral, and we obtain:

$$E_\varphi(r, \bar{z}, t) = \frac{M_z}{8\pi^{3/2}\sigma} \cdot \left(\frac{\mu\sigma}{t}\right)^{3/2} \cdot \frac{\partial}{\partial r} e^{-\frac{\mu\sigma\sqrt{r^2+\bar{z}^2}}{4t}}. \tag{8}$$

Suppose that a vertical measuring coil (i.e., receiver coil 7) of effective cross-section q is at the z-axis. Based on equation (8) we can write the expression for the electromotive force Emf induced in the receiver coil 7:

$$Emf = \frac{M_z q}{8\pi\sqrt{\pi}\sigma} \cdot \left(\frac{\mu\sigma}{t}\right)^{5/2} \cdot \exp\left(-\frac{\mu\sigma}{4t} \cdot \bar{z}^2\right). \tag{9}$$

It can be concluded that the time attenuation of Emf is governed by the function $t^{-5/2}$ if the time range $t \gg 0$ is considered.

Proceeding from the results obtained for the step function excitation, we will consider the electromagnetic field created by an impulse with an arbitrary shape. Let us assume that the impulse shape is described by the function $P(\tau)$. The electric field related to the impulse $P(\tau)$ can be calculated through the convolution $P(\tau)$ with the function $e(t)$. The function $e(t)$ is the electromagnetic field arising from the excitation with a step function.

Figure 9:
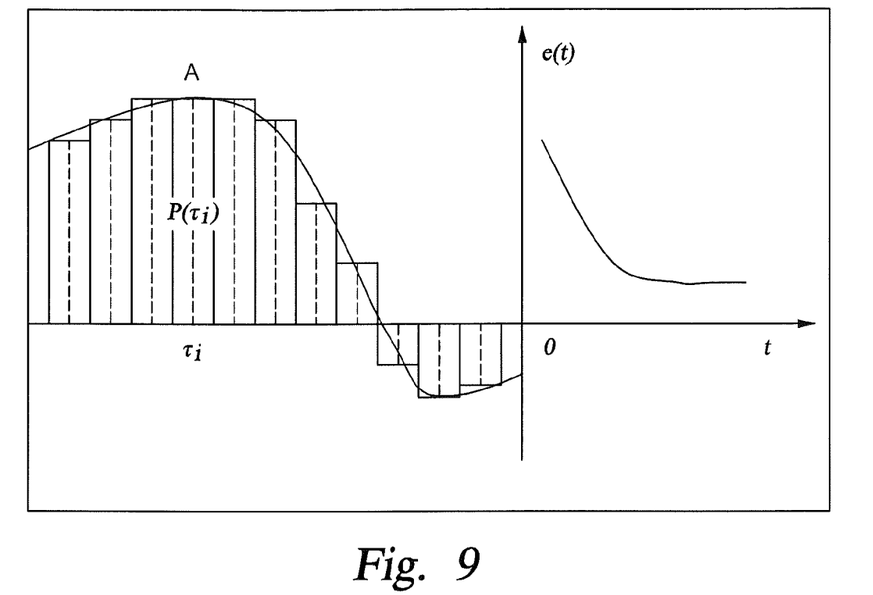
FIG. 9 depicts aspects of transient electromagnetic field excitation by a current impulse with an arbitrary shape.

We will use the numerical analog of the convolution integral. As it is shown in FIG. 9, an arbitrary pulse $P(\tau)$ can be presented as a sum of short rectangular pulses. If N rectangular pulses of durations $\Delta\tau$ are used, the total response can be presented as follows:

$$E(t) = \sum_{i=1}^{N} P(\tau_i) \cdot \left[ e\left(t - \tau_i \frac{\Delta\tau}{2}\right) - e\left(t - \tau_i + \frac{\Delta\tau}{2}\right) \right]. \tag{10}$$

Note that the representation of equation (10) lets us reduce computational time. In fact, we can calculate the response from the step function excitation only once. Then, the values of this function obtained for a broad time range can be used in equation (10) many times.

Next, the measured signal as a sum of partial responses from different parts of the medium is presented. Special attention is paid to evaluating methods for creating a desirable distribution of currents in space. We would like to be able to generate currents with a maximum intensity in the region of interest (i.e., the target zone or the zone of investigation 14). Now let us study the role of the impulse shape in creating the necessary distribution of the current 9. With this purpose in mind, we present the measured response as a sum of partial responses from different parts of the medium. The current flow in the medium can be subdivided into currents 9 flowing within rings that have the same axis as the dipole inducing the currents 9.

Suppose that the cross-section of the ring of radius r is $dr \cdot d\bar{z}$. According to the Ohm's law, the current $\Delta J$ that flows in the ring can be described in a following manner:

$$\Delta J = E_\varphi(r, \bar{z}, t) \cdot \sigma \cdot dr \cdot d\bar{z} \tag{11}$$

where $E_\varphi(r, \bar{z}, t)$ is an electric field in a uniform media:

$$E_\varphi(r, \bar{z}, t) = \frac{M_z \cdot r}{16\pi\sqrt{\pi}\,\sigma} \cdot \left(\frac{\mu\sigma}{t}\right)^{5/2} \cdot \exp\left[-\frac{\mu\sigma}{4t}(r^2 + \bar{z}^2)\right]. \tag{12}$$

We can use the Biot-Savart law and calculate the magnetic field related to the ring with current $\Delta J$. In our case, the measuring coil is located at the axis (FIG. 8), then an expression for the electromagnetic field of a circular current can be used. Thus, we obtain the expression for the electromotive force. The signal is generated by elementary current ring:

$$dEmf = q\mu\sigma \cdot \frac{\partial E_\varphi}{\partial t} \cdot \frac{r^2 \, dr \, d\bar{z}}{2[r^2 + (z - \bar{z}^2)]^{3/2}}. \tag{13}$$

The contribution to the measured signal arising from the cylindrical area D ($r_1 \leq r \leq r_2$; $\bar{z}_1 \leq \bar{z} \leq \bar{z}_2$) can be expressed as the following integral:

$$Emf_D = \frac{M_z q \mu}{32\pi\sqrt{\pi}} \frac{\partial}{\partial t} \left\{ \left(\frac{\mu\sigma}{t}\right)^{5/2} \cdot \int_{r_1}^{r_2} \int_{\bar{z}_1}^{\bar{z}_2} \frac{r^3 e^{-\frac{\mu\sigma}{4t}(r^2 + \bar{z}^2)} \, dr \, d\bar{z}}{[r^2 + (z - \bar{z}^2)]^{3/2}} \right\}. \tag{14}$$

The inversion of transient logging data is presented next. To investigate the possibility of using transient fields to study the near-borehole zone, we constructed an inversion algorithm based on the Born Approximation of the forward problem. The main advantage of this approach is that it establishes the linear dependence of a signal on disturbances in the conductivity.

Let us consider the electric field in a homogeneous environment:

$$E_\varphi = i\omega\mu \cdot \frac{M_z r}{4\pi R^3} \cdot (1 + kR) \cdot e^{-kR}. \quad (15)$$

If a circular disturbance of conductivity $\Delta\sigma$ with a cross-section $drd\bar{z}$ appears at the first approximation, it may be interpreted as an extraneous current:

$$\Delta J = \Delta\sigma \cdot E_\phi(r,\bar{z}) \cdot drd\bar{z}, \quad (16)$$

which creates an additional (anomalous) field. The signal from this source at the axis can be defined by means of equation (17) based on the reciprocity law:

$$\Delta Emf(z) = i\omega\mu \cdot \frac{\Delta J(r, \bar{z})q r^2}{2\overline{R}^3} \cdot (1 + k\overline{R}) \cdot e^{-k\overline{R}}. \quad (17)$$

Substituting the current equation (16) into equation (17), we obtain the following results for an anomalous electromotive force:

$$\Delta Emf(z) = -\omega^2 \mu^2 \Delta\sigma \cdot \frac{M_z q r^3}{8\pi R^3 \overline{R}^3} \cdot (1 + kR) \cdot e^{-kR} \cdot (1 + k\overline{R}) \cdot e^{-k\overline{R}} drd\bar{z} \quad (18)$$

where $R = \sqrt{r^2 + (z-\bar{z})^2}$, $\overline{R} = \sqrt{r^2 + \bar{z}^2}$, $\bar{z}$- is a point in the excited environment containing the secondary current; and $z$ is an observation point at the axis.

Using Fourier transformation we proceed to the time domain and arrive at this representation of the anomalous field of a thin circular disturbance of conductivity:

$$\Delta Emf(t) = \frac{M_z q r^3}{8\pi\sqrt{\pi} \, R^3 \overline{R}^3} \cdot \frac{\mu^2 \Delta\sigma}{t^2} \cdot e^{-x^2} \cdot \quad (19)$$

$$x \cdot \left[2x^4 - 5x^2 + \frac{R\overline{R}\mu\sigma}{4t} \cdot (4x^4 - 20x^2 + 15)\right] drd\bar{z}$$

where $$x = \sqrt{\frac{\mu\sigma}{4t}} \cdot (R + \overline{R}).$$

This should then be integrated in respect to $r$ and $\bar{z}$. Thus, the complete field from N circular disturbances in a linear (Born) approximation may be expressed as follows:

$$Emf(t) = Emf_0(t) + \sum_{i=1}^{N} G_i(t) \cdot \Delta\sigma_i \quad (20)$$

where $Emf_0(t)$ is the normal signal from a homogeneous environment (e.g. equation (12)), and $G_i$ is found from equation (19).

If we substitute the measured full signal into the left part of equation (20) and consider the conductivity of the reference homogeneous environment known, equation (20) yields a linear set for defining disturbances. However, we may use the values of the apparent resistivity. At much later times, equation (12) enables us to define the apparent resistivity as follows:

$$\rho_\tau = \frac{\mu}{4\pi t} \cdot \left(\frac{\mu M_z q}{Emf \cdot t}\right)^{2/3}. \quad (21)$$

Figure 10:
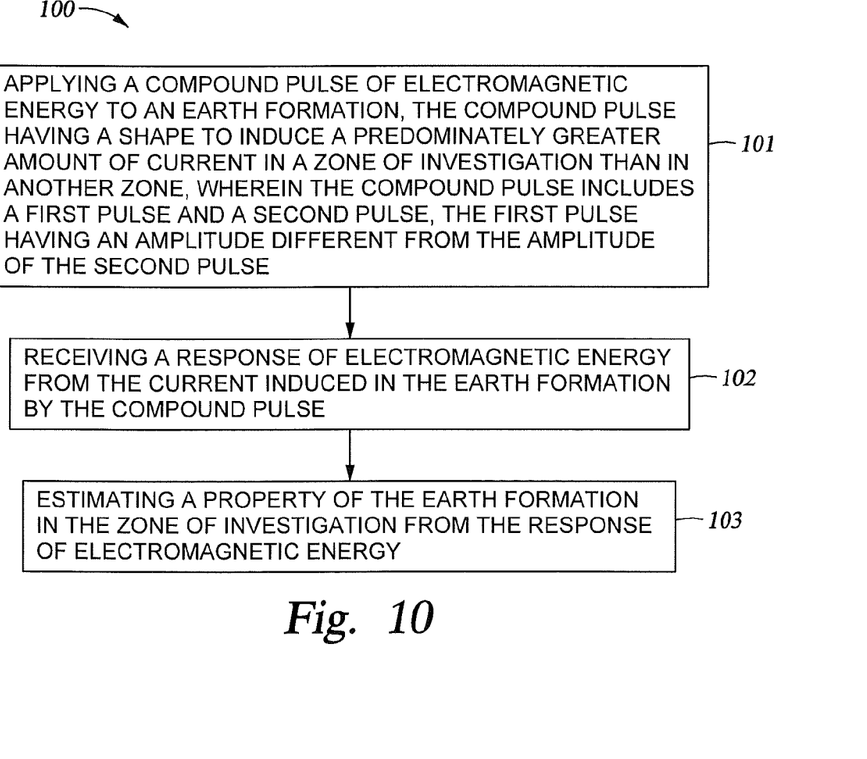
FIG. 10 presents one example of a method for estimating a property of an earth formation in a zone of investigation.

FIG. 10 presents one example of a method 100 for estimating a property of the earth formation 4 in the zone of investigation 14 where the earth formation 4 includes the zone of investigation 14 and another zone. The method 100 calls for (step 101) applying the compound pulse 21 to the earth formation 4. The compound pulse 21 has a shape that induces a predominately greater amount of the current 9 in the zone of investigation 14 than in the another zone. The compound pulse 21 includes the first pulse 23 and the second pulse 24, the first pulse 23 having an amplitude different from the amplitude of the second pulse 24. Further, the method 100 calls for (step 102) receiving the response 22 from the current 9 induced in the formation 4 by the compound pulse 21. Further, the method 100 includes (step 103) estimating the property from the response 22.

In support of the teachings herein, various analysis components may be used, including a digital and/or an analog system. For example, the electronic unit 12 and the processing unit 13 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit, electromechanical unit, connectors or supports may be included in support of the various aspects discussed herein or in support of other functions beyond this disclosure.

Elements of the embodiments have been introduced with either the articles "a" or "an." The articles are intended to mean that there are one or more of the elements. The terms "including" and "having" and their derivatives are intended to be inclusive such that there may be additional elements other than the elements listed. The conjunction "or" when used with a list of at least two terms is intended to mean any term or combination of terms. The terms "first," "second" and "third" are used to distinguish elements and do not denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for estimating a property of an earth formation in a zone of investigation, the earth formation comprising the zone of investigation and another zone, the method comprising:
    applying a compound pulse of electromagnetic energy to the earth formation using a transmitter disposed in a borehole penetrating the earth formation, the compound pulse comprising a shape to induce a predominately greater amount of current in the zone of investigation than in the another zone, wherein the compound pulse comprises a first pulse and a second pulse, the first pulse comprising an amplitude whose absolute value is different from an absolute value of the amplitude of the second pulse, a duration of the first pulse being greater than a duration of the second pulse when a polarity of the first pulse is different from a polarity of the second pulse, and the first pulse is applied before the second pulse and the amplitude of the first pulse is greater than the amplitude of the second pulse;
    receiving a response of electromagnetic energy from the current induced by the compound pulse; and
    estimating the property from the response of electromagnetic energy.

2. The method of claim 1, wherein the first pulse is derived from a first pulse of direct current in a transmitter coil of the transmitter and the second pulse is derived from a second pulse of direct current in the transmitter coil.

3. The method of claim 2, wherein the first pulse of direct current comprises a constant amplitude and the second pulse of direct current comprises a constant amplitude.

4. The method of claim 1, wherein a polarity of the first pulse is opposite of a polarity of the second pulse.

5. The method of claim 1, wherein the compound pulse further comprises a third pulse, wherein the first pulse amplitude is greater than the second pulse amplitude and the second pulse amplitude is greater than an amplitude of the third pulse.

6. The method of claim 5, wherein each of the first pulse, the second pulse and the third pulse comprise a same polarity.

7. The method of claim 1, wherein the property comprises conductivity.

8. The method of claim 7, wherein estimating the conductivity comprises solving the equation:

$$Emf_D = \frac{M_z q \mu}{32\pi\sqrt{\pi}} \cdot \frac{\partial}{\partial t}\left\{\left(\frac{\mu\sigma}{t}\right)^{5/2} \cdot \int_{r_1}^{r_2} \int_{\bar{z}_1}^{\bar{z}_2} \frac{r^3 e^{-\frac{\mu\sigma}{4t}(r^2+z^2)} dr d\bar{z}}{[r^2+(z-\bar{z})^2]^{3/2}}\right\}$$

where: $Emf_D$ represents a voltage induced by the response of electromagnetic energy;
$M_z$ represents a vertical magnetic moment aligned along a longitudinal axis of the borehole penetrating the earth formation;
q represents an effective cross-sectional area of a receiver coil for receiving the response of electromagnetic energy;
μ represents magnetic permeability of the earth formation;
σ represents conductivity;
t represents time;
r represents a radial distance from the longitudinal axis;
$\bar{z}$ represents a distance measured along the longitudinal axis; and
z represents an observation point at the longitudinal axis;
wherein the zone of investigation is a cylindrical volume centered about the longitudinal axis, the cylindrical volume having a minimum radius of $r_1$ and a maximum radius of $r_2$ and a length extending from $\bar{z}_1$ to $\bar{z}_2$.

9. The method of claim 1, wherein the property comprises a boundary.

10. The method of claim 1, wherein the second pulse follows the first pulse with substantially no delay.

11. An apparatus for estimating a property of an earth formation in a zone of investigation, the earth formation comprising the zone of investigation and another zone, the apparatus comprising:
    a logging instrument;
    a transmitter disposed in a borehole penetrating the earth formation;
    a receiver; and
    a processing system configured to implement the following instructions:
        applying a compound pulse of electromagnetic energy to the earth formation, the compound pulse comprising a shape to induce a predominately greater amount of current in the zone of investigation than in the another zone, wherein the compound pulse comprises a first pulse and a second pulse, the first pulse comprising an amplitude whose absolute value is different from an absolute value of the amplitude of the second pulse, a duration of the first pulse being greater than a duration of the second pulse when a polarity of the first pulse is different from a polarity of the second pulse, and the first pulse is applied before the second pulse and the amplitude of the first pulse is greater than the amplitude of the second pulse;
        receiving a response of electromagnetic energy from the current induced by the compound pulse; and
        estimating the property from the response of electromagnetic energy.

12. The apparatus of claim 11, wherein the transmitter comprises a coil.

13. The apparatus of claim 12, wherein a plane of the coil is aligned perpendicular to a longitudinal axis of the borehole penetrating the earth formation.

14. The apparatus of claim 11, wherein the receiver comprises a coil.

15. The apparatus of claim 11, wherein the receiver is disposed a distance from the transmitter.

16. A computer program product stored on non-transitory machine-readable media comprising machine-executable instructions for estimating a property of an earth formation in a zone of investigation, the earth formation comprising the zone of investigation and another zone, by implementing a method comprising:

applying a compound pulse of electromagnetic energy to the earth formation using a transmitter disposed in a borehole penetrating the earth formation, the compound pulse comprising a shape to induce a predominately greater amount of current in the zone of investigation than in the another zone, wherein the compound pulse comprises a first pulse and a second pulse, the first pulse comprising an amplitude whose absolute value is different from an absolute value of the amplitude of the second pulse, a duration of the first pulse being greater than a duration of the second pulse when a polarity of the first pulse is different from a polarity of the second pulse, and the first pulse is applied before the second pulse and the amplitude of the first pulse is greater than the amplitude of the second pulse;

receiving a response of electromagnetic energy from the current induced by the compound pulse; and estimating the property from the response of electromagnetic energy.

17. The computer program product of claim 16, wherein the property comprises at least one of conductivity and a boundary.

* * * * *